Nov. 17, 1964     D. A. SUTTON     3,156,981
GEOMETRICAL INSTRUMENTS
Filed Feb. 20, 1961     2 Sheets-Sheet 1
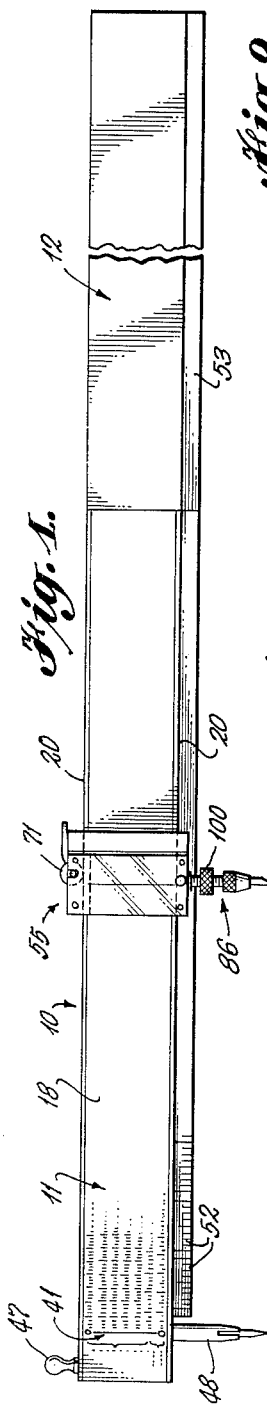
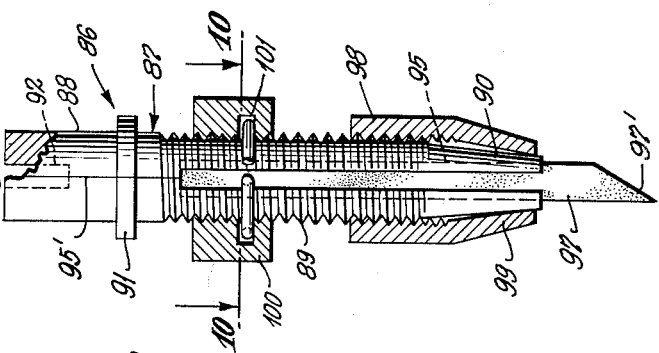
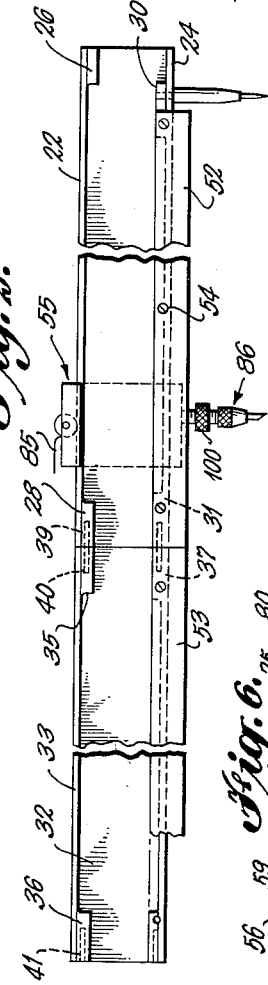
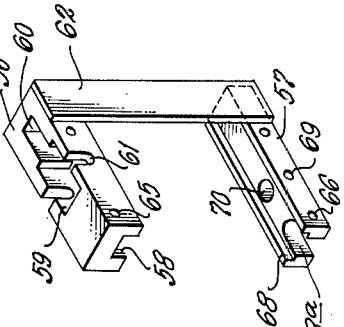
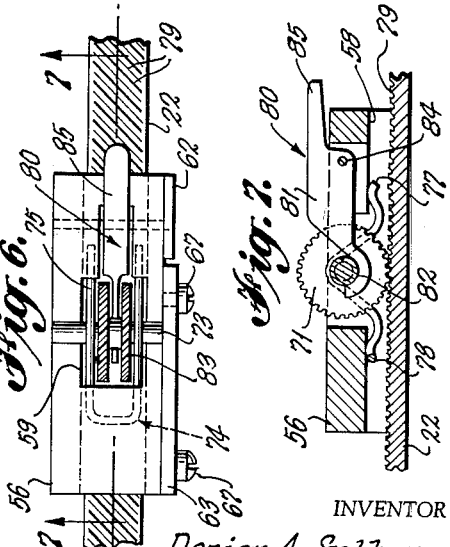
INVENTOR
Dozier A. Sutton
BY *Shoemaker and Mattare*
ATTORNEYS Nov. 17, 1964  D. A. SUTTON  3,156,981
GEOMETRICAL INSTRUMENTS
Filed Feb. 20, 1961  2 Sheets-Sheet 2
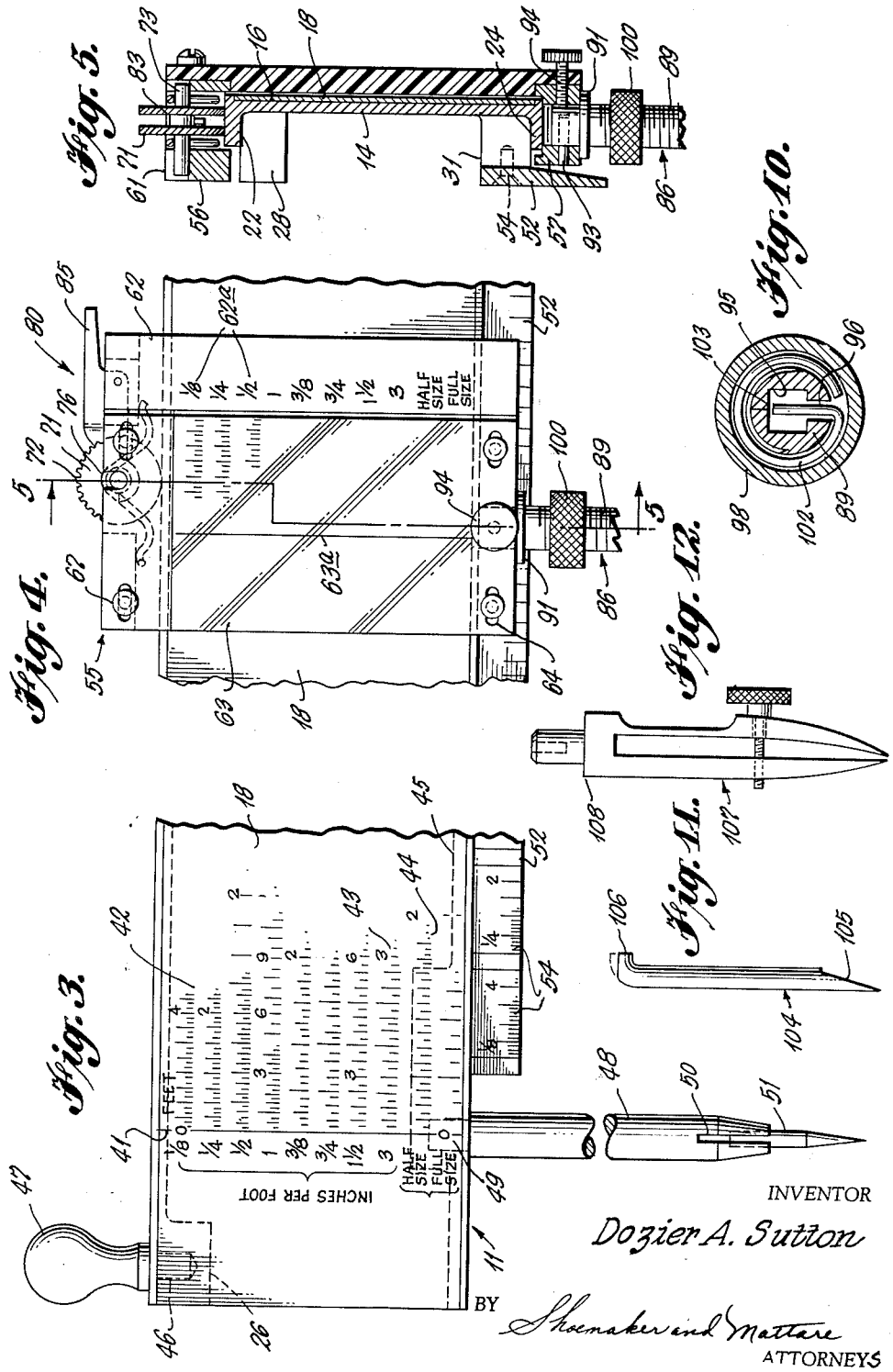
INVENTOR
Dozier A. Sutton
BY
Shoemaker and Mattare
ATTORNEYS

United States Patent Office 3,156,981
Patented Nov. 17, 1964

3,156,981
GEOMETRICAL INSTRUMENTS
Dozier A. Sutton, 57 Bedford Road, Newport News, Va.
Filed Feb. 20, 1961, Ser. No. 90,481
7 Claims. (Cl. 33—27)

This invention relates generally to the class of geometrical instruments and is directed more particularly to an instrument of the nature of a beam compass incorporating a direct reading scale and which instrument may be more appropriately called a beam scale.

In normal drafting procedures several types of tools are required, necessitating frequent searching around the working area for the proper instruments in their respective sequence of use. For instance, in drawing a measured circle the radius must be measured and marked with a scale and pencil and a bow pencil or beam compass is then adjusted to the measured radius in order to draw the circle. Also in this type of work where conventional tools are employed the draftsman is frequently required to maintain an uncomfortable position over the drawing paper, having to bend over to position his face close to the paper in order to line up scale divisions for the marking of desired points on the paper. Because of these facts the work becomes very tedious and tiring to the eyes and requires a number of physical motions and procedures which may be eliminated by use of the present invention.

In consideration of the foregoing difficulties the present invention has for a particular object the provision of a new and novel geometrical instrument wherein many of the difficulties of laying out drawings may be overcome by the provision of a beam scale having a plurality of measuring scales thereon and the beam scale combining in its structure an edge scale carrying relatively short measuring scales corresponding to the main scales on the beam scale and wherein the beam scale has associated therewith a means for easily and quickly locating or selecting division points for accurately marking a measurement or drawing a measured circle in exact accordance with the selected division point.

Another important object is to provide a beam scale which is distinguished from conventional drafting instruments through the provision of division points on the main scales of the beam scale which are so positioned or arranged as to be easily selected at eye level and so that such division points may be marked on the drawing paper from a comfortable position by setting the index point on a reference line and simply lowering the beam scale to mark the division point, as a result of which such settings and marking procedures are accomplished more easily and with less tedium than the procedures involved with the conventional drafting instruments.

In the present invention the edge scale is designed to be used on the beam scale in conventional fashion to mark minute division points which cannot be readily selected with the hairline on the cursor. The provision of the edge scale on the beam scale increases the effectiveness of the beam scale and the efficiency of the draftsman by providing the different facilities on the same instrument without having to search out or refer to other conventional scales. In other words, the present beam scale is designed to provide in one instrument the same facilities which normally require the use of several drafting scales; a large bow pencil; a conventional beam compass; large dividers; a large bow pen and a ruling pen. In the present beam scale structure the cusor is adapted to be removed from the beam scale and used as a ruling pen with the inking element attached thereto.

Another object of the invention is to provide an instrument of the character stated wherein the edge scale, laid off in drafting scale subdivisions corresponding to similar subdivisions on the beam, can be used independently of the beam scale for laying off division points, the edge scale being adapted to be used while attached to the beam scale or removed for independent use.

Another object of the invention is to provide a new and novel type of beam scale having a removable edge scale secured along the bottom edge of the beam which may be used independently of or in conjunction with the beam scale and wherein a new and novel type of runner or cursor is mounted upon the beam scale with means for frictionally retaining it in a set position and which means may also be manipulated so as to release the cursor for fast sliding adjustment, the cursor and edge scale being so constructed and arranged one with respect to the other that the edge scale may be laid flat on the drawing paper for use without interfering with the movement of the cursor on the beam.

A still further object of the invention is to provide a beam scale structure designed in a novel manner whereby extension sections may be coupled together so as to increase or decrease the length of the beam as desired.

A still further object of the invention is to provide in a geometrical instrument of the character stated, a novel means carried by the scale runner or cursor for supporting a marking element in a novel manner whereby the point of the marking element can be set or adjusted with respect to a hairline on the cursor and further wherein a novel means is provided which will facilitate the advancement of the marking means as the same wears down, without necessitating its removal from the cursor and without having to make any changes in the position of the cursor on the beam.

The invention will be best understood from a consideration of the following detailed description taken in connection with the accompanying drawings forming a part of this specification with the understanding, however, that the invention is not confined to a strict conformity with the showing of the drawings but may be changed or modified so long as such changes or modifications mark no material departure from the salient features of the invention as defined by the appended claims.

In the drawings:

FIG. 1 is a view in front elevation of a beam scale constructed in accordance with the present invention showing the same in two detachably connected sections.

FIG. 2 is a view of the two section beam scale shown in FIG. 1 and viewed from the rear, with the middle portions of the sections broken away.

FIG. 3 is a front elevational view on an enlarged scale showing more clearly the layout of the linear divisions, portions only of each of the lines of divisions being shown and showing also a portion of the edge scale.

FIG. 4 is a view on an enlarged scale looking at the front side of the cursor with adjacent portions of the scale beam.

FIG. 5 is a transverse section taken substantially on the line 5—5 of FIG. 4.

FIG. 6 is a view in top plan and on an enlarged scale of the cursor and adjacent portions of the beam.

FIG. 7 is a sectional view taken in a vertical plane substantially on the line 7—7 of FIG. 6.

FIG. 8 is a view in perspective of the cursor frame with the friction roller and adjacent parts removed and with the transparent window of the cursor removed.

FIG. 9 is a view on a greatly enlarged scale partly in section and partly in elevation of the lead holder and feeder.

FIG. 10 is a transverse section taken on the line 10—10 of FIG. 9 and illustrating the manner in which the split ring is mounted on the stylus and showing the lead bore of rectangular cross section for the reception of either a cylindrical or square lead.

FIG. 11 is a view in elevation of a prick pin adapted for use in substitution for the lead in the lead holder.

FIG. 12 is a view in elevation of a bow pen adapted for attachment to the slide in place of the lead holder.

Referring now more particularly to the drawings the numeral 10 generally designates the beam scale of the present invention, the same being here shown as comprising the two sections 11 and 12 detachably coupled together in the manner hereinafter described.

The two sections of the beam scale are preferably formed of a suitable lightweight metal such as aluminum or the like, although it is to be understood that the invention is not limited to the use of this material.

The section 11 may be referred to as the main section of the beam scale and the section 12 as the attached or extension section.

The main section 11 comprises a bar 14 of substantial width, the face of which is provided with a shallow recess 16 in which is set a scale carrying plate generally designated 18. The recess is relatively shallow and has the top and bottom bordering flanges 20 between which the plate 18 is located.

The bar body 14 is bordered on its rear side by the reinforcing longitudinal flanges 22 and 24. The flange 22 extends along the top edge of the beam body and at its ends it is formed with the blocks or pads 26 and 28 which project slightly beyond the edge of the flange as shown in FIG. 5. Adjacent to the bottom flange 24 the back of the bar is formed with corresponding pads 30 and 31 which are of slightly less thickness from the front of the body 14 to their rear faces than the pads 26 and 28. In other words the pads 26 and 28 which are designed to support the scale beam on the drawing paper surface are of slightly less height than the pads 30 and 31 and the difference between the height of these pads and of the pads 26 and 28 is made up by the thickenss of the hereinafter described edge scale.

The extension section 12 of the scale beam is formed in a similar manner to the section 11 in that the back of the body 32 thereof is bordered by the top and bottom longitudinal flanges 33 and 34. At the ends of the flange 33 the body is extended rearwardly in the form of the blocks or pads 35 and 36 and at the bottom edge of the body 32 there are formed the pads 37 and 38 which like the pads 30 and 31 are of slightly less thickness from the front to the rear of the bar for the purpose hereinafter set forth.

The sections 11 and 12 are detachably connected together by means of coupling pins carried by the pads 28 and 31 on the inner end of the first or main section 11 of the scale beam and insertable in sockets in the adjacent or opposing pads 35 and 37 in the attached second section. The pins connecting the two sections are designated 39 and the sockets into which they project are designated 40.

While it has been stated that the pins 39 are carried by the pads 31 and 28 of the first or main section for extension into sockets 40 in the adjacent pads, obviously this arrangement may be reversed if desired and accordingly the invention is not to be understood to be restricted to this specific ararngement.

The pads 36 and 38 at the other or outer end of the section 12 are here shown as being provided with the longitudinally extending sockets 40 opening through the end of the bar for receiving coupling pins of a third section, not shown, if such a section is available for extending the length of the scale beam. Obviously, this is an arbitrary manner of connecting the beam sections together since other means may be devised for this purpose and therefore the description of this arrangement is not to be taken as limiting the invention to this manner of coupling the sections together.

The face of the extension section 12 is here shown as flat or blank, the scale plate 18 being illustrated as terminating adjacent to the inner end of the section 12. However, this extension section 12 may have a recess in the face thereof corresponding to the recess 16 if desired so as to receive an extension scale if such an addition is desirable.

The scale plate 18 has marked thereacross at the left end thereof, the zero line 41 and from this zero line there are laid off longitudinally of the plate 18 a number of proporitional scales which, as illustrated, designate fractions of an inch to the foot. For example, the scale 42 is laid off for proportioning ⅛" to the foot and the succeeding scales are laid off to proportion ¼" to the foot, ½" to the foot and the standard 1" linear scale, etc. These proportional scales proceed as designated to the scale 43 which is laid off for measuring the proportion of 3" to the foot and following this 3" scale are a half size scale 44 and a full size scale 45 which as shown is laid off or divided in 1" divisions which in turn are divided in the standard way in 16ths.

While the proportional scales referred to are here illustrated and described as applied to the scale plate or panel 18 which is set into the recess 16, these scales may also be laid off directly upon the front or face of the beam body 14.

It is to be understood that the number and type of scales applied to or shown on the face of the panel 18 may be varied in accordance with specific requirements, that is to say that such panel may carry navigation scales, scales in the metric system, etc.

The zero line 41 is inset at any suitable or arbitrary distance from the left end of the beam and outwardly from this zero line the top pad 26 has set therein the pin extension 46 of a nob 47. This nob stands up from the top edge of the scale beam as shown and is provided to facilitate holding the beam in position while scribing arcs or circles in the manner hereinafter set forth.

The nob 47 may be fixed or it may be swivelly connected with the beam so as to further provide for ease in using the instrument.

The numeral 48 designates a centering or pivot leg which is fixed at its top end to the bottom edge of the beam section 11, in a suitable manner. The means here illustrated for securing the leg to the bottom edge of the beam is by means of a reduced extension portion 49 at the end of the leg 48 which is introduced into the material of the beam body and secured in a suitable manner as, for example, it may be press fitted into the beam or it may be secured by a transverse pin, not shown.

The leg 48 has a tapered and slotted lower end as indicated at 50 to frictionally receive the centering pin 51. The leg 48 is set so as to have its longitudinal center aligned with the zero line 41 and this, of course, aligns the point of the pin 51 with the zero line also.

As hereinbefore stated, the pads 30, 31, 37 and 38 are of less thickness from the front of the body of which they form a part to their back surfaces than the pads at the top edges of the beam sections. These lower pads 30, 31, 37 and 38 have secured thereagainst and longitudinally of the beam parts or sections, edge scales 52 and 53. The edge scales 52 and 53 are preferably secured by screws 54 as illustrated in FIG. 2, whereby such scales may be removed for use separately from the beam scale if desired.

The edge scales 52 and 53 are of the proper thickness in the portions thereof which are secured to the pads so as to bring the total thickness of the beam from the forward face thereof to the back surface of the edge scale to equality with the thickness of the beam scale at the top edge from the forward face thereof to the back faces of the top edge pads 26, 28, 35 and 36. Thus, when the beam scale is laid flat on a working surface the face will be horizontal and the back face of the edge scales will support the lower edge portions of the beam scale sections.

The edge scales 52 and 53 project downwardly beyond the bottom edges of the beam scale sections 11 and 12 as illustrated in FIGS. 1 to 5 and the forwardly presented and exposed face of each edge scale carries a series of proportional scales corresponding to or duplicating the proportional scales on the face of the attached beam. These proportional scales are generally designated 54 and while two only are shown in detail as in FIG. 3, where the ⅛″ to the foot and ¼″ to the foot scales are shown, it will be understood that such scales are continued along the edge scale strip or blade, duplicating as above stated, the proportional scales on the face of the beam or the scale plate 18. Mounted upon the beam scale is a slide or runner which is generally designated 55 and which carries a suitable marking implement in the manner hereinafter described and which implement may be in the form of a pencil lead, a prick point or a bow pen.

The runner 55 is designed in a novel manner whereby it can be adjusted on and longitudinally of the scale bar while the latter is lying flat upon the work sheet, thus making it possible to adjust the runner while the bar is in such position.

To facilitate this manner of shifting the runner on the scale bar the runner comprises a top or head block 56 and a bottom or base block 57 which blocks are adapted to receive the adjacent edges of the bar in the following manner.

The head block which, like the base block, is of rectangular form, has a guide slot 58 in its under surface which is of proper width to receive the top of the scale bar either in the portion 11 or the portion 12 thereof. In addition to this longitudinal slot 58, the head block has formed therethrough the vertical slot 59 which is adapted to receive a friction roller, hereinafter described, and the back or rear end of this slot 59 has the reduced extension 60 for the reception of a portion of a roller releasing lever.

The vertical slot 59 has the opposite walls thereof provided with bearing slots 61 in which the hereinafter described roller supporting pivot pin seats at its ends.

The head block and base block 56 and 57 are connected together by a narrow plate 62 which positions at its ends against the forward faces of the blocks and at the rear ends thereof as shown in FIG. 8. The width of this connecting plate 62 is relatively small as compared with the length of the blocks which it connects and there is disposed against the forward faces of the blocks between the inner edge of the connecting plate 62 and the opposite ends of the blocks 56 and 57, the transparent hairline carrying pane 63, the thickness of which is preferably approximately the same as the thickness of the connecting plate 62. This transparent pane 63 has adjacent its top and bottom edges the transversely spaced pairs of adjustment slots 64 and extending through these slots and threaded in openings 65 and 66 in the head and bottom or base plates respectively are securing screws 67. By means of the elongate or elliptical slots 64 which extend in the longitudinal direction of the bar, it will be seen that the transparent plate or pane 63 may be given a slight adjustment across the width of the runner for the purpose hereinafter described.

The connecting plate 62 may be secured to the head and base blocks in any suitable manner either by the use of screws or preferably by means of a suitable adhesive such as an epoxy resin adhesive.

The lower or base block 57 has in its inner and upper surface the guide channel 68 which receives the lower edge of the scale beam section on which the runner is mounted, as illustrated in FIG. 5.

In addition to the screw holes 66 the base block has formed therein a drilled and tapped hole 69 and there is formed vertically through the base block the vertical opening 70, the axle center of which is in the vertical plane of the axis of the hole 69.

The vertical slot 59 in the head block 56 has positioned therein a friction wheel 71 which has a knurled periphery 72 and which wheel is mounted upon a pivot pin 73 which extends across the vertical slot 59 and has its end seated in the bearing slots 61.

The roller 71 is drawn down into operative engagement with the top surface of the bar upon which the runner is positioned, by means of a spring which is generally designated 74 and which, as shown in dotted outline in FIG. 6, is preferably of substintially U-form. The sides or legs 75 of this spring have the roller 72 disposed therebetween and, as shown in dotted outline in FIG. 4, the legs are bent to form the upwardly projecting loops 76 in which the ends of the pivot pin 73 position while the free ends 77 of the legs 75 and the cross connecting portion 78 between the legs at the opposite ends thereof extend beyond the ends of the vertical slot 59 and bear against the bottom of the downwardly facing guide channel 58, as best seen in FIG. 7.

The top surface of each of the sections of the scale bar is toothed or knurled as indicated at 79 for engagement by the knurling of the friction roller 71 so that as the spring pulls the roller down into engagement with the knurled surface 79 the runner will be drawn up so as to keep the bottom of the groove 68 in the base block in frictional contact with the bottom edge of the scale bar and accidental movement of the runner on the scale bar will be prevented.

This holding of the runner is also assisted by the frictional engagement by the pivot pin 73 and the looped portion of the spring legs so that sliding movement of the runner which will cause the pivot pin to rotate, will create some friction between the pivot pin and the spring legs.

To facilitate quick release of the runner or the disengagement of the roller 71 from the knurled edge surface of the scale bar a pivoted lever 80 is provided by which to lift the roller against the resistance of the spring 74. In the structure here illustrated the roller 71 is shown as being formed in two portions which are in spaced relation on the pivot pin and the lifting lever 80 comprises a long flat body portion 81 having a crooked finger 82 forming its forward end, which is positioned between the two roller portions to engage under the hub part 83 between such portions. The lower part of the body 81 of the lever extends into the slot extension 60 and is supported therein by a pin 84 extending transversely of the slotted extension 60 and the opposite end of the body from the finger 82 is formed to provide the arm extension 85 which is disposed at an upward inclination with respect to and above the adjacent end of the head block 56 as is clearly shown in FIG. 7. Thus, it will be seen that by taking the runner between the thumb and forefinger, with the thumb on the bottom side of the base block 57 and the forefinger on the arm 85 of the lever and compressing the lever, the roller will be lifted from engagement with the underlying scale bar.

The aperture 70 in the bottom block 57 is designed to receive a portion of a marking implement either in the form of a pencil lead carrying stylus of the type shown in detail in FIG. 9, or a bow pen of the character shown in FIG. 12. Also the stylus is designed to carry a pencil lead or a prick point or prick pin of the form shown in FIG. 11 and hereinafter more particularly described. This stylus is of novel construction so that it will not only maintain the marking lead in proper position for use but it is adapted to receive either circular lead or a lead of rectangular cross section and it is further designed to facilitate feeding the lead outwardly as the latter wears away.

The stylus for carrying the lead or carrying the prick point comprises a long body 87 of circular cross section having the top end portion 88 which is adapted to be extended into the aperture 70 in the base block of the runner and having a lower and longer portion which is externally screw threaded as indicated at 89 through the major portion of its length and which terminates at its free end in a tapered tip 90. The threaded portion 89 and the top end portion 88 are divided by the collar 91.

The top end portion or head 88 of the stylus has a longitudinal slot 92 therein which opens through the side thereof as shown in FIG. 9 and which slot receives a guide and centering pin 93 when the head portion 88 is extended into the aperture 70. This guide and centering pin 93 is carried by the base block 57 and projects into the opening 70 as illustrated in FIG. 5.

When the head portion 88 is inserted into the opening 70 it is secured in place by the set screw 94 which is threaded into the opening 69.

The threaded portion 89 of the stylus has extending through the major portion of the length thereof, a bore 95. This bore 95 is of polygonal cross section as shown in FIG. 10 and it is designed in this manner or to have this cross sectional form so that there may be used a cylindrical lead or a lead of polygonal cross section to fit in the bore. The stylus is shown in FIGS. 9 and 10 as having a central longitudinal division line 95' which results from the making of the stylus in two sections which are suitably channeled so that when the sections are placed together the desired polygonal bore will be obtained. Any suitable means may be employed for maintaining the two sections of the stylus permanently joined together such as by the use of an epoxy resin, a screw, pin or the like.

In addition to the bore 95 the wall of the stylus is provided with a longitudinal slot 96, shown in FIGS. 9 and 10 and the width of this slot is materially less than the width of the bore to receive a portion of the hereinafter described lead feeding means.

The bore 95 receives a suitably pointed marking element such as the pencil lead 97 and this is held in fixed position in the conventional manner as by means of a chuck sleeve 98 which is threaded onto the tapered end of the stylus and which chuck sleeve has the usual internally tapered tip 99 which compresses the tapered end 90 which is slotted entirely across the diameter of the stylus in the conventional manner, although such fully transverse slot is not illustrated.

The stylus in the threaded portion 89 carries a lead feeding means which comprises a nut 100 which is threaded onto the stylus above the sleeve 98 and which nut is provided interiorly with the annular channel 101 in which is positioned a resilient split ring 102 which has a portion of one end turned to extend radially inwardly to form the finger 103. This finger 103 of the split ring extends through the slot 96 and into the bore 95 and engages against the top end of the lead 97. Thus it will be seen that when the clamping sleeve 98 which forms an element of the lead securing chuck, is threaded outwardly to release the gripping action upon the lead, rotation of the nut 100 in the proper direction will move the finger 103 toward the outer end of the stylus and force the lead outwardly.

Since the bore 95 is made of polygonal cross section so as to receive a lead of cylindrical form or a lead of the same cross section as the bore, the lead designated 97 in FIG. 9 may be representative of either form. That is, it may be of either the cylindrical or the polygonal form.

FIG. 11 illustrates the prick point referred to, to be used in place of the marking lead 97 and which point comprises a pin body generally designated 104 and having one end pointed as indicated at 105. The body of the pin is of a diameter to be received snugly in the bore 95 of the stylus while the upper end of the pin body carries a short laterally projecting lug 106 which will engage in the slot 96 so as to keep the pin body from turning therein and, of course, the pin body will be secured in position in the bore by means of the clamping sleeve 98 as will be obvious.

FIG. 12 generally designates the conventional type of bow pen which is generally designated 107 and this pen has at the top end thereof the slotted cylindrical stud 108 which is adapted to be received in the opening 70 and secured therein by means of the set screw 91.

The marking lead 97 is shown as having a chisel point 97' and the means for adjusting the transparent body 63 facilitates bringing the hairline 63a in line with the tip or edge of this chisel point whereby a very accurate measurement can be laid off between the pin 51 and the marking lead of the stylus or between the point 51 and the point 105 of the prick pin. The accurate setting of the hairline with respect to the marking edge of the lead 97 or with respect to the point of the prick pin 104 is effected by first measuring a certain distance as, for example, 10", between the point 51 and the marking edge of the lead, on a standard linear scale. This setting is then laid off on a sheet of paper and the slide is adjusted on the scale bar to bring the hairline onto the 10" designation on the scale bar. The point 51 and the point of marking lead 97 are then compared with the 10" marking made previously on the paper and if the markings do not agree then the screws 67' holding the adjustable transparent pane 63 are loosened and while the pane is held against movement the portion of the slide to which it is attached is shifted as may be necessary to bring the point of the lead to the point marked on the paper, after which the screws 67 are tightened and the slide will then be accurately set with the hairline 63a directly in line with the marking point edge of the chisel point 97' or in line with the point 105 of the prick pin 104.

The pin 104 and the bow pen 107 are designed to be substituted for the stylus and are designed in such a manner that the tips of the points thereof will be in alignment with the hairline at the moment of replacement, and this applies also to the pencil lead marking edge, so that the hairline need not be readjusted to suit the tips of the respective points. To facilitate this the hairline is adjusted initially with the edge of the pencil lead.

The connecting strip 62 forming a part of the slide has reference characters thereon as indicated at 62a corresponding to the characters of the proportioning scales laid off on the beam scale. These characters are aligned with the scales on the beam so that the user of the instrument can readily select the proportioning scale which he desires to use without having to refer back to the zero end of the scale when the slide may be removed some distance from that end of the beam scale.

The edge scale 52 or 53 carrying the series of short regular drafting scales as indicated at 54 which correspond as a complete set to the drafting scales on the beam, is intended for marking off small divisions for which the other or longer scales cannot be used so that small divisions and subdivisions of any scale used on the main scale may be marked from the same instrument laid flat on the paper. Also, the edge scale being carried directly on the beam scale avoids the user having to refer to or use another or separate scale. The larger measurements can be set very efficiently on the scale by the hairline of the slide and the association of the short scales on the edge scale provides a highly versatile instrument.

The edge scale may be removed if desired for separate use and also by adding a second edge scale such as the one designated 53 or by the addition of a blank strip on the second portion 12 of the illustrated beam scale the length of the instrument may be extended and such edge scales used as a marking straight-edge and obviously also the addition of the second part 12 to extend the overall length of the instrument provides a convenient means for drawing large circles.

It will be noted upon reference to FIG. 8 that the end of the base block nearest to the zero index line 41 is provided with a longitudinally directed recess which is designated 63a. This recess is of sufficient width to receive the pin 48 whereby the hairline 63a of the transparent pane carried by the runner can be moved into close proximity to the zero line so that circles of very small diameter can be drawn as it will be seen that with this arrangement the marking stylus 86 can be positioned in close proximity to the pivot point 51.

While the friction wheel 71 has been illustrated and described as being formed in two parts with the hub 83 of the pivot therebetween and with the lever finger engaging this hub, it is also within the purview of the present invention to form this wheel as a solid member and bifurcate the forward end of the lever 80 to receive such solid wheel therein or between the furcations.

It will also be noted upon reference to FIG. 5 particularly and to FIG. 8 that the head block 56 is of materially greater width than the base block 57. This construction provides for a substantial area of supporting contact for the ends of the pivot pin 73 and also the narrower base block permits the body 52 of the edge scale to project downwardly behind the base block, thus allowing the slide body to move freely on the beam and along and in front of the short scales carried by the edge scale body.

I claim:

1. In a geometrical instrument, a scale bar comprising an elongate flat bar body having longitudinal top and bottom edge flanges projecting from one face, the opposite face forming the front of the bar and carrying longitudinally extending scales, a slide on the bar and comprising spaced head and base blocks having the scale bar therebetween and said blocks having confronting channels slidably receiving said flanges, a rigid flat coupling member between said blocks and lying across the front of the bar, a transparent hairline carrying pane extending across corresponding side faces of and connecting said blocks and overlying said face of the bar and coplanar with said flat coupling member, releasable means carried by said head block and engaging the adjacent flange for holding the slide against free movement on the bar, a marking implement carried by the base block, a pivot pin secured to the bottom edge flange at one end of the bar, said marking implement and pivot pin being parallel and perpendicular to the flange, and means upon the said one face of the bar for supporting the latter flat on a surface with said slide blocks spaced from said surface to permit sliding movement of the slide on the bar.

2. The invention according to claim 1, with an elongate scale strip secured longitudinally of the bottom edge of the bar body rearwardly of the bottom edge flange and said scale strip having a portion thereof projecting below the said bottom edge flange and presenting a longitudinal surface having a scale thereon.

3. The invention according to claim 2, wherein said scale strip comprises an element of said supporting means.

4. In combination with a beam scale having a runner thereon and having a pointed pin secured to one end and providing a pivot leg, a stylus carried by said runner for scribing circles around the pivot leg, said stylus comprising an elongate cylindrical member having an axial bore extending from a free end thereof and having a radially opening longitudinal wall slot extending into said bore, the member being externally screw threaded and said bore receiving an elongate marking element, means for securing the marking element in the bore, and means for moving the marking element outwardly from the bore comprising a nut threaded on the cylindrical member above said securing means and means housed in and swivelly coupled with the nut and extending in part through said wall slot for engagement with the inner end of the marking element within the bore, said nut having an inside annular channel forming a housing and the last said means comprising a radially inwardly directed terminal portion of a split annulus encircling the cylindrical member and loosely seated within said annular channel.

5. The invention according to claim 4, wherein said runner includes a transparent panel carrying a hairline perpendicular to the beam for cooperation with indicia on the beam, said bore is of polygonal cross section to receive a marking lead of the same cross section and having a chisel edge marking end paralleling one side of the bore and aligned with said hair line.

6. In a beam scale, the new combination of a bar of substantial width having flat top and bottom longitudinal edges and having a face with a front side provided with a shallow longitudinally extending recess having top and bottom longitudinal flanges, a scale carrying plate set in and extending longitudinally of said recess, said plate having longitudinal rows of indicia scales thereon and the plate having a zero line across the face thereof common to the scales thereon and adjacent to one end of the bar, a pivot leg secured at one end in the bottom edge of said bar adjacent to the said one end of the bar and having a pointed centering pin extending from its other end, said pin having the point thereof aligned with said zero line, a runner on said bar and comprising top and bottom relatively long parallel blocks having opposing faces longitudinally channeled to slidably receive the top and bottom edges of said bar and a relatively narrow plate connecting the blocks at adjacent ends and extending across the face of the scale plate, a transparent pane coplanar with said narrow connecting plate and having top and bottom edge portions overlying and attached to said blocks and also having a vertical hairline thereon, a stylus having a top end detachably connected to the underside of the bottom block in spaced parallel relation with said pivot leg and including a chisel point marking element having the marking edge thereof aligned with said hairline, and means whereby said runner may be moved on the bar to a position to project the transparent pane over and beyond said zero line for positioning the hairline and zero line relatively closely together.

7. The new combination as set forth in claim 6, wherein the said means comprises a relatively deep recess formed in the end of the bottom block nearest to said pivot leg and of a size to receive the pivot leg when the runner is moved toward the zero line.

References Cited in the file of this patent
UNITED STATES PATENTS

| 242,895 | Derby | June 14, 1881 |
| 584,076 | Goldsmith | June 8, 1897 |
| 1,404,794 | Reitenbaugh | Jan. 31, 1922 |
| 1,598,993 | Vlazny | Sept. 7, 1926 |
| 2,438,337 | Gordon | Mar. 23, 1948 |
| 2,867,042 | Sutton | Jan. 6, 1959 |
| 2,972,810 | Davis | Feb. 28, 1961 |

FOREIGN PATENTS

| 238,206 | Germany | Sept. 27, 1911 |
| 674,961 | Great Britain | July 2, 1952 |